June 30, 1964  S. J. GAIDO  3,138,861
BUTT EDGE JOINING OF ENAMEL COATED PIPES
Filed Sept. 20, 1960

San Jacinto Gaido
INVENTOR.

BY Tom Arnold

ATTORNEY

United States Patent Office 3,138,861
Patented June 30, 1964

3,138,861
BUTT EDGE JOINING OF ENAMEL COATED PIPES
San Jacinto Gaido, Houston, Tex., assignor to Gaido-Lingle Co., Inc., Houston, Tex., a corporation of Texas
Filed Sept. 20, 1960, Ser. No. 57,278
4 Claims. (Cl. 29—475)

This invention relates to coated pipe lines, and more particularly to preparation of pipe for laying and laying of pipe lines.

It is today common in the construction of pipe lines, to coat the pipe to be laid with an enamel of asphaltic or other character, and frequently this coating is then often wrapped with a felt or other fabric, preferably while the enamel coating is still sufficiently fluid to soak a bit into and bind said wrapping.

When pipe is being laid in pipe lines, however, discrete lengths of pipe, sometimes in the oil country termed "joints" of pipe, are joined together, usually by welding, as they are added to the line.

The joints of pipe are usually joined or secured, one to another, at the pipe line site just prior to the laying into a trench which is to be the permanent resting place of the pipe line.

Conventional practice is for joints of coated pipe for such work to be prepared for the welding either at the place of coating, or at the pipe line construction site just prior to welding, by the stripping of coating from perhaps six inches of pipe adjacent each end of the joint, leaving the coating which is commonly 3/16 to 5/16 inch thick with a square-butt end such as that illustrated at 3 in FIGURE 1.

Thereafter, a joint (assuming some pipe line is already laid) is moved into position with an end thereof abutting the already laid portion of the line, and the two lengths of pipe are welded together. There then remains an uncoated section on either side of the weld back to the butt-edge of the coating cut-back, and this uncoated section must be coated in some way to prevent its being eaten away and destroyed by corrosion.

The practice is to either wrap that section of the pipe with an appropriately treated or impregnated fabric wrapping, or to pour some hot molten and pourable pipe line coating enamel onto the section of the pipe which needs to be coated, or both.

This practice has been standard for many years, and over those years has always suffered a significant defect. The hot enamel does not bond well with the cold enamel at the butt-edge of the cut-back, and cracks, holes and the like, in the industry called "holidays" develop at this point, inviting water seepage and inviting corrosion to commence therethrough. A pipe line is much like the chain that is only as strong as its weakest link—the pipe line that is sound for 100 miles may be put out of service by a single hole corroded from a start invited by a holiday that developed when the cold precoated enamel did not bond well with the new enamel added to cover a weld connection and adjacent cut-backs.

An alternative, sometimes thought by some to be effective, is to coat the cut-back portion of the pipe, not with a hot flowing enamel, but rather by an appropriate fabric coating wrap not greatly unlike, in general insulating purpose, common electrician's friction tape. But such fabrics tend to age, to lose water tightnesses—particularly at their point of joining with the butt-edge of the enamel coating where by the nature of the abutment the wrap does not build up smoothly and tightly, but always with a bump trapping air beneath the wrapping.

If the wrapping is substantially water tight as is desired for best corrosion prevention, the trapped air becomes a small cell of expansible character that heats up on hot days and exerts pressure and cools during cool nights and retracts the pressures, flexing the coating, testing it, until it weakens a mite from age and cracks, or perhaps until a lap is parted even while the wrap is new. Thus is an avenue for water to seep next to the pipe and commence corrosion created by the square abutment of the cut-back enamel coating.

An object of this invention is to provide improved coated pipe and pipe-preparation and a method of pipe line laying, which permit good tight bonds, without trapped air, to be effected by conventional field hands working without special care, between the pre-coated coating, and the new coating added after a weld to cover the cut-backs.

Other objects are apparent from the following description and accompanying drawings.

These objects are accomplished in accordance with this invention by providing a relatively low-angle bevel at the end of the coating, i.e., at the limit of the cut-back, and properly utilizing this feature.

Figure 1:
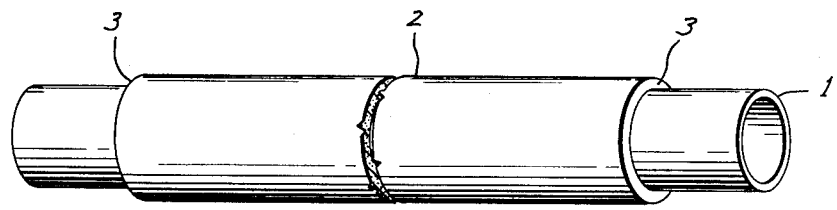
FIGURE 1 is a pictorial view of the pipe conventionally used prior to this invention, having a coating thereon cut back from both ends thereof with a substantially square-butt coating end.

As aforesaid, the conventional practice is to coat pipe about to be laid in a pipe line, and leave or cut a "cut-back" at either end. Thus in FIGURE 1 there is illustrated a joint of pipe 1, the main length of which is coated with coating 2 presumed to be conventional pipe line enamel with a felt exterior wrap. The coating 2 ends perhaps six inches from each end of the pipe 1, at a coating abutment 3.

Figure 2:
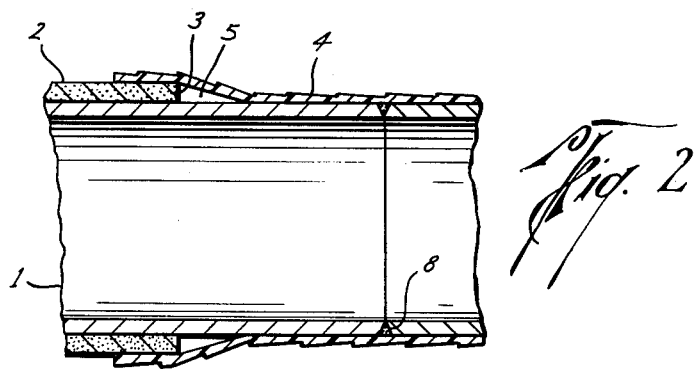
FIGURE 2 is a sectional detail of a portion of a joint of pipe secured into a pipe line, with the cut-back portion of the pipe covered with a felt or fabric covering.

In FIGURE 2 a portion of a piece of pipe 1 is illustrated in cross section, with coating 2, thereon, the cut-back portion being wrapped with a felt 4. The pipe 1 is welded at 8 to adjoining pipe. An air-space 5 at the butt-end of the enamel coating 2 is apparent, and such trapped air as this works to destroy the effectiveness of the wrap as above described.

It will be noted that when the enamel coating is butt-ended, as at 3, particularly when it is felt-wrapped on the outside, a problem is also presented when the cut-back area is coated with molten enamel. The enamel 2 of the butt-end 3 is cold, and the pipe is fairly cold, and the surface 3 of the butt-end which is exposed to the molten enamel to be added, is perhaps 3/16 of an inch across—a very small surface upon which to make a bond. And cracks and other forms of holidays do frequently develop at such interfaces.

Figure 3:
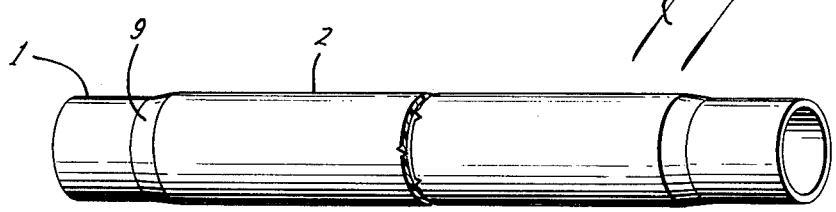
FIGURE 3 is a view comparable to that of FIGURE 1, of a joint of pipe prepared in accordance with this invention with the coating end tapered.

By contrast, if in the process of making the pipe ready and securing it into the pipe line, the enamel coating is beveled as illustrated in FIGURE 3, with a conical beveled interface 9 that may be 3/4 inch to an inch in length from the thin-out at the pipe to the outside of the full coating thickness, fabric wraps of the cut-back area make up smoothly without any air being trapped as at 5 in FIGURE 2, and the fabric wrap is as good along the cut-back and at the interface joining with the enamel pre-coating, as fabric wrap is anywhere.

Figure 4:
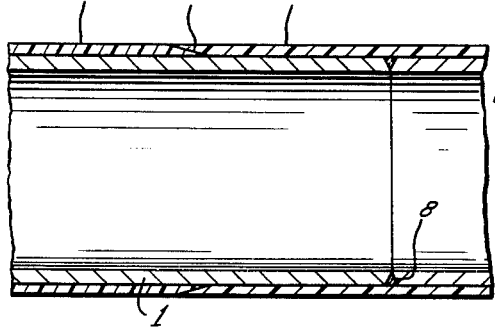
FIGURE 4 is a sectional detail of a portion of a joint of pipe secured into a pipe line, with a bevel-ended cut-back portion coated with enamel.

In FIGURE 4, an enlarged sectional detail of the ultimate joint between a beveled enamel coating 2 and a molten enamel coating 6 on a cut-back area of pipe 1 is illustrated, with the vertical dimension of the coating exaggerated for illustrative purposes. It is to be noted that by contrast with a joint of pre-coating enamel 2 with cut-back coating enamel 6 added after welding of only the thickness of the pre-coated enamel, perhaps 3/16 inch, the bonding interface 7 betwen the pre-coated and newly-coated enamels such as in FIGURE 4, may be 3/4 inch, or easily as much as one or even one and a quarter inches. Molten enamel for the cut-back, in routine application procedures, even by sloppy workmen, is spread upon this longer dimension 9 in significant quantity. There is no tendency to trap air bubbles as at the butt-end 3 of the pre-coated enamel. And the new molten enamel 6 faces enough surface 9 of the pre-coated enamel to assure a partial melting, a fusing and bonding of the old to the new around the full 360° of the pipe, by contrast with past experience of often finding holidays at the interface caused by air entrapment or other cause, such as stringers of shredded felt from the outside of the pre-coated coating, holding molten enamel enough off the pre-coated enamel to prevent a fusing and sound bonding.

While various bevel angles are usable, those which are substantially more than 35° with the pipe surface afford still a marked degree of square-butt-end characteristics and thus are substantially ineffective for the purposes of this invention. Bevel angles less than 35°, such as 20° with the pipe surface for example, are thus preferred, for at such bevel angles there are no abrupt changes in total exterior contour and there is a surface of interface between pre-coated enamel and new coating which is markedly more than twice that surface of contact with a butt-end cut-back.

It is apparent from the foregoing that the concept of this invention takes the form of both a novel article of manufacture, namely a coated pipe with bevel-ended cut-back, and also a novel method of preparing pipe for and laying pipe lines, wherein a characteristic step is the beveling of the end of the cut-back.

The beveling may be done in the field by whittling with a pocket knife in instances where the enamel is soft enough, or by other knives mounted in the nature of those used in pocket style pencil sharpeners, wherein a knife blade is rotated around a pencil and cuts off a shaving from the wood of the pencil while leaving the lead protruding past the knife end. If desired, the crank-style pencil sharpener rotational blades may be made to dimensions to cut the enamel into the desired bevel while not cutting the pipe. Thus a variety of mechanisms ranging from the simple sharp blade to multi-moving-part mechanisms which are available to perform the beveling step, and have been so known for years, though no one prior to this invention conceived the invention and the improved results to be obtained therefrom.

The foregoing description is to be considered as illustrative only, and is not to be considered as restrictive of the invention as defined in the following claims.

I claim:
1. The method of joining two lengths of pipe line, which lengths have been previously provided with a continuous and uniform pre-coating of fusible corrosive resistant pipe line enamel along their exterior surface comprising the steps of:
   forming a cut-back portion of said pre-coating on one end of each of said lengths, which portions are substantially free of said enamel,
   forming the pre-coating of each of said lengths with a conical beveled interface at the limit of said cut-back portion, which beveled interface has an angle of less than about 35°,
   welding said ends of said lengths together in an end to end abutting relationship,
   applying a uniform and continuous coating of molten, corrosive resistant, fusible pipe line enamel to the full circumferential surface of said cut-back portions and fusing said coating with said beveled interfaces of said pre-coatings, and
   allowing said coating to cool and to thereby set,
   whereby said lengths are joined together in a continuous pipe line having a continuous, corrosive resistant coating of enamel thereon.

2. The method of joining two lengths of pipe line, which lengths have previously been provided with a continuous and uniform pre-coating of fusible, corrosive resistant pipe line enamel along their exterior surfaces comprising the steps of:
   forming a cut-back portion on an exterior end of each of said lengths, which portions are substantially free of said enamel for a few inches from said ends,
   shaping said pre-coatings at the limit of said cut-back portions with conical beveled interfaces having angles of less than 35° with respect to the longitudinal axes of said lengths,
   welding said ends of said lengths together in an end to end abutting relationship,
   applying a uniform and continuous new coating of pourable, molten, corrosive resistant, fusible pipe line enamel to the full circumferential surface of said cut-back positions,
   partially melting a portion of said beveled interfaces of said pre-coatings by the heat of said coating of molten enamel,
   fusing and bonding said new coating with said interfaces of said pre-coatings, and
   allowing said new coating to cool and to thereby set,
   whereby said lengths are joined together in a continuous pipe line having a continuous, corrosive resistant coating of enamel thereon.

3. The method of joining two lengths of pipe line together, which lengths have a pre-coating of corrosive resistant pipe line enamel between about 3/16 and about 5/16 inch thick along their exterior surfaces comprising the steps of:
   forming a cut-back portion on an exterior end of each of said lengths, which portions are substantially free of said enamel for a distance of about 6 inches from said ends and 360° around the circumference of said lengths,
   shaping said pre-coatings at the limits of said cut-back portions with conical beveled interfaces which are at least about 3/4 inch wide from the thin-out at the exterior surface of the pipe to the outside of said pre-coating and which extend 360° around the circumference of said lengths, said beveled interfaces having an angle of less than about 35° with respect to the axes of said lengths,
   securing said ends of said lengths together in an end to end abutting relationship,
   pouring a new uniform and continuous coating of hot molten, corrosive resistant, fusible pipe line coating enamel around the entire surface of said cut-back portions,
   partially melting a portion of said interfaces of said pre-coatings by the heat of said coating of molten enamel,
   fusing and bonding said new coating with said pre-coatings for 360° around said lengths, and
   allowing said new coating to cool and to thereby set,
   whereby said lengths are joined together in a continuous pipe line having a continuous corrosive resistant coating of pipe line enamel thereon.

4. The method as claimed in claim 3 wherein:
   a coating of fabric wrapping is applied to said new coating just prior to the step of allowing said new coating to cool and to thereby set.

References Cited in the file of this patent
UNITED STATES PATENTS

| | | |
|---|---|---|
| 2,287,163 | Bishop | June 23, 1942 |
| 2,765,288 | Whittier et al. | Oct. 2, 1956 |
| 2,786,264 | Colombo | Mar. 26, 1957 |

FOREIGN PATENTS

| | | |
|---|---|---|
| 26,449 | Great Britain | Oct. 23, 1902 |